Patented May 15, 1923.

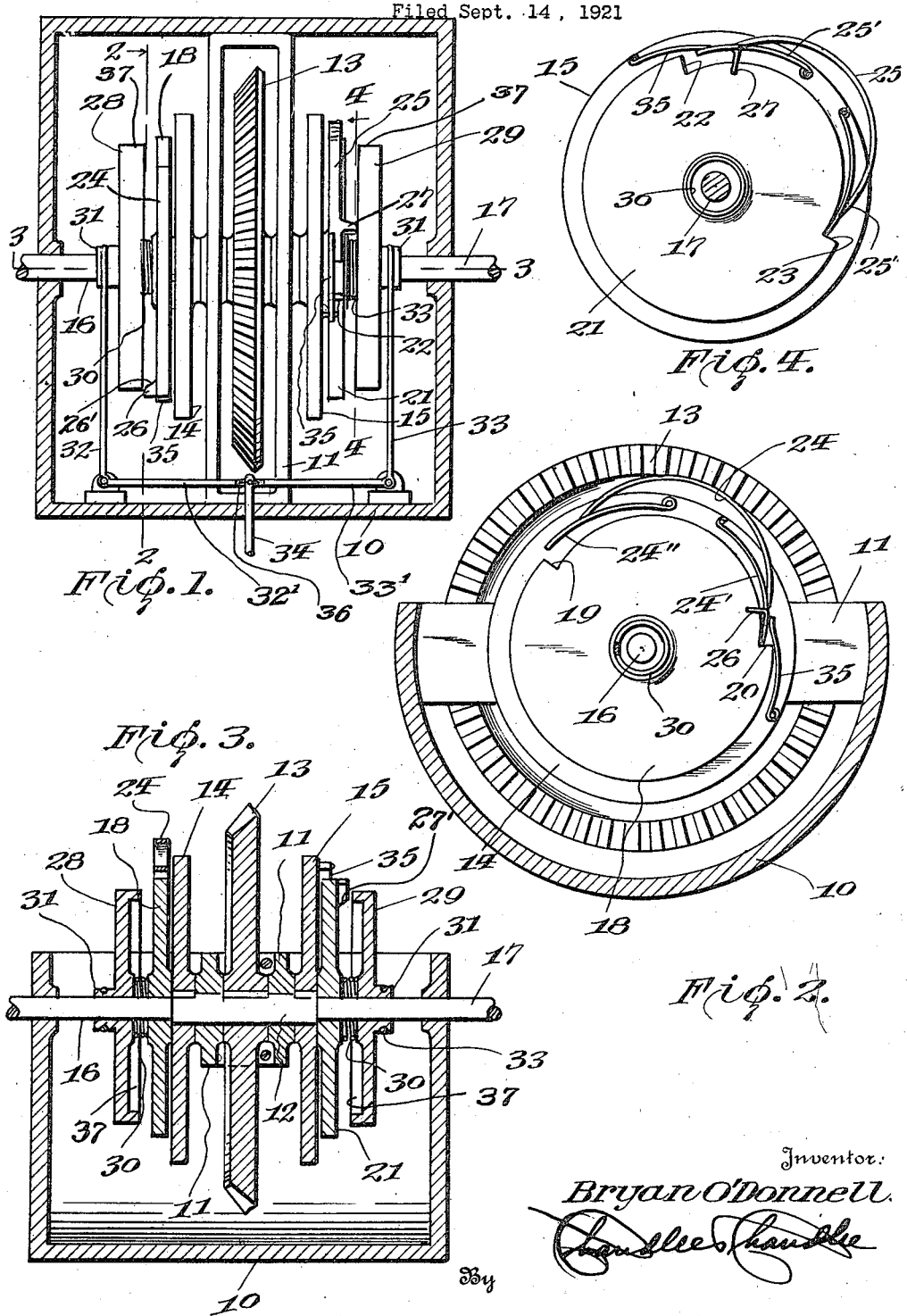

1,455,650

UNITED STATES PATENT OFFICE.

BRYAN O'DONNELL, OF VAIL, IOWA.

DIFFERENTIAL GEAR.

Application filed September 14, 1921. Serial No. 500,478.

*To all whom it may concern:*

Be it known that I, BRYAN O'DONNELL, a citizen of the United States, residing at Vail, in the county of Crawford, State of Iowa, have invented certain new and useful Improvements in Differential Gears; and I do hereby declare the following to be a full, clear, and exact description of the invention, such as will enable others skilled in the art to which it appertains to make and use the same.

This invention relates to new and useful improvements in gearing and particularly to differential gearing for motor driven vehicles.

One object of the invention is to provide a device of this character wherein the usual multiplicity of gears is done away with.

Another object is to provide a device of this character in which are included novel driving means for the rear axles, both in a forward and reverse direction.

Other objects and advantages will be apparent from the following description when taken in connection with the accompanying drawing in which, Figure 1 is a plan view of the differential gearing, the casing or housing being in section.

Figure 2 is a vertical longitudinal sectional view through the housing, and transversely of one of the axles, on the line 2—2 of Figure 1, Figure 3 is a vertical transverse sectional view taken longitudinally of the axles, on the line 3—3 of Figure 1.

Figure 4 is an elevation of the disks 15 and 20 and the pawls engaged thereon.

Referring particularly to the accompanying drawing, 10 represents a housing in which is mounted the horizontal frame including the parallel side bars 11. Rotatably supported in the intermediate portion of the frame is the transverse shaft 12, and keyed on this shaft, for rotation therewith, and between the bars 11, is a large gear 13, that shown in the drawing being a bevel gear, it being understood that the gear may be of any type desired, and which is driven from the transmission or propeller shaft of the automobile, not shown. On the opposite ends of the shaft 12, outwardly of the side bars 11, of the frame, are the disks 14 and 15, the same being keyed to the shaft for rotation therewith.

Rotatably supported in the opposite sides of the housing, and extending inwardly to points in close proximity to the ends of the shaft 12, and in alignment therewith, are the axle sections 16 and 17. On the inner end of the axle section 16 is secured a disk 18, in the peripheral face of which are formed the oppositely directed ratchet teeth 19 and 20. Secured to the inner end of the other axle section 17 is a similar disk 21, having in its peripheral face the oppositely directed ratchet teeth 22 and 23. It will be noted that the disks 18 and 21 are smaller in diameter than the disks 14 and 15, and pivotally mounted on the outer face of the disk 14, are the pawls 24' and 24" which are adapted for engagement, respectively with the ratchet teeth 19 and 20. A bowed spring 24 is engaged with these pawls. Normally, however, the pawl 24' engages the tooth 20, while the pawl 24" is out of engagement with the tooth 19. Pivotally mounted on the outer face of the disk 15 are the similar pawls 25' and 25" which are adapted for engagement with the ratchet teeth 22 and 23, respectively. A bowed spring 25 engages these pawls. Normally, however, the pawl 25' engages the tooth 22, while the pawl 25" is out of engagement with the tooth 23. The said ends of the pawls are normally urged into friction contact with the peripheral faces of the disks 18 and 21 whereby when the shaft 12 and gear 13 are rotated in either direction, one or the other of the pawl ends will engage with a ratchet tooth and cause the simultaneous rotation of the axle section disk, and the rotation of the axle section. Formed on the pawl 24' is a laterally extending and inclined lug 26, and on the corresponding pawl 25', is a similar lug 27, said lugs extending outwardly transversely of the peripheral faces of the disks 18 and 21, and beyond the vertical outer faces of the said disks 18 and 21. Each of the lugs 26 and 27 is formed with an inclined face, numbered 26' and 27', respectively. Slidable on the axle sections 16 and 17 are the disks 28 and 29, each having its peripheral edge turned laterally at an angle, in a direction toward one of the lugs 26 or 27, as shown at 37 and being arranged to engage with the inclined edge portion 26' or 27' of a lug, when moved inwardly toward the disk. A coil spring 30 is mounted on each axle section, between a disk 18 or 21, and a disk 28 or 29, to normally and resiliently hold the latter disks away from the lugs.

Each disk 28 and 29 has a peripherally slotted or grooved hub 31 and engaged in these grooves are the inner ends of the levers 32 and 33, respectively, the outer ends 32' and 33' of the levers being pivotally connected to a link 34 which extends to and is connected with a shifting lever (not shown), within convenient reach of the driver of the vehicle, said ends being slotted, as shown at 36, in Figure 1.

In the ordinary operation of the device, the shaft 12 and gear 13 being driven in a forward direction, the disks 14 and 15 will turn therewith, and through the engagement of the pawls 24' and 25', with the teeth 19 and 22, of the disks 18 and 21, respectively, the axle sections 16 and 17 will be driven in a forward direction. When the automobile makes a turn, as for instance toward the left, the outside or right hand wheel would travel faster than the inside wheel, and consequently the axle section 17 would turn faster than the axle section 16, with the result that the disk 21 would move faster than the adjacent disk 15, with the result that the tooth 22, of the disk 21 would move ahead of the end 25' of the pawl 25. This movement would continue until the automobile has made the turn and had again taken a straight course. Similarly, when the automobile turns to the right, the disks and pawls at the left hand side of the differential, will operate to permit the left hand wheel to run faster than the right hand wheel.

When it is desired to reverse the direction of the automobile, the gear 13 and shaft 12 are rotated in the opposite direction from that previously mentioned, and the levers 32 and 33 moved to force the disks 28 and 29 inwardly and release the pawls 24' and 25' from the teeth 20 and 23, whereupon the pawls 24'' and 25'' will be rocked through the influence of the bowed springs 24 and 25, to engage their other ends with the other teeth 19 and 22, respectively, of the disks 18 and 21. If a turn is made while backing, the outside wheel of the automobile would turn faster than the inside wheel, and cause the outside disk 18 or 21, to run ahead of the adjacent disk 14 or 15.

The pawls 24'' and 25'', being normally out of engagement with the peripheral faces of the disks 18 and 21 are rocked into position to engage with the teeth 19 and 22, when the disks 28 and 29 are moved inwardly to rock the ends 24' and 25' out of engagement with the teeth 19 and 22. A leaf spring 25 is mounted on the outer face of each of the disks 18 and 21 and one engages with the pawl 24' and the other with the pawl 25' to hold them in position for engagement with teeth of the disks.

What is claimed is:

1. A differential including a driving shaft, a pair of longitudinally alined driven shafts, a disk on each end of the driving shaft, a disk on each of the driven shafts adjacent a disk of the driving shaft, each of the first disks having oppositely directed notches, pawls carried by each of the second disks, a pawl of each of the disks normally engaging one of the notches of a corresponding first disk, and means for simultaneously rocking the pawls to disengage the engaged pawls and engage the disengaged pawls with the remaining notches of the disks.

2. A differential including a driving shaft, driven shafts, a disk on each of the driven shafts having oppositely disposed teeth in their peripheries, a disk on each end of the driving shaft and disposed in close proximity to one of the driven shaft disks, spring pressed pawls carried by the driving shaft disks with one of each of said pawls normally engaged with a disk tooth, each of said normally engaged pawls having a projection extending transversely of the periphery of a driven disk and formed with an inclined face, and flanged disks slidable on the driven shafts for engagement with the said inclined faces to disengage the associated pawls and engage the other pawls.

In testimony whereof, I affix my signature, in the presence of two witnesses.

BRYAN O'DONNELL.

Witnesses:
J. H. O'Connor,
L. A. Dieter.